Oct. 26, 1965 R. A. ASHTON ETAL 3,213,857
ADJUSTABLE DRIVE AND AIR INTAKE
FOR A COMBINE FANNING MILL
Filed March 15, 1963 3 Sheets-Sheet 2

INVENTORS
ROBERT A. ASHTON &
BY WILBERT D. WEBER

ATTORNEYS.

Oct. 26, 1965   R. A. ASHTON ETAL   3,213,857
ADJUSTABLE DRIVE AND AIR INTAKE
FOR A COMBINE FANNING MILL
Filed March 15, 1963   3 Sheets-Sheet 3
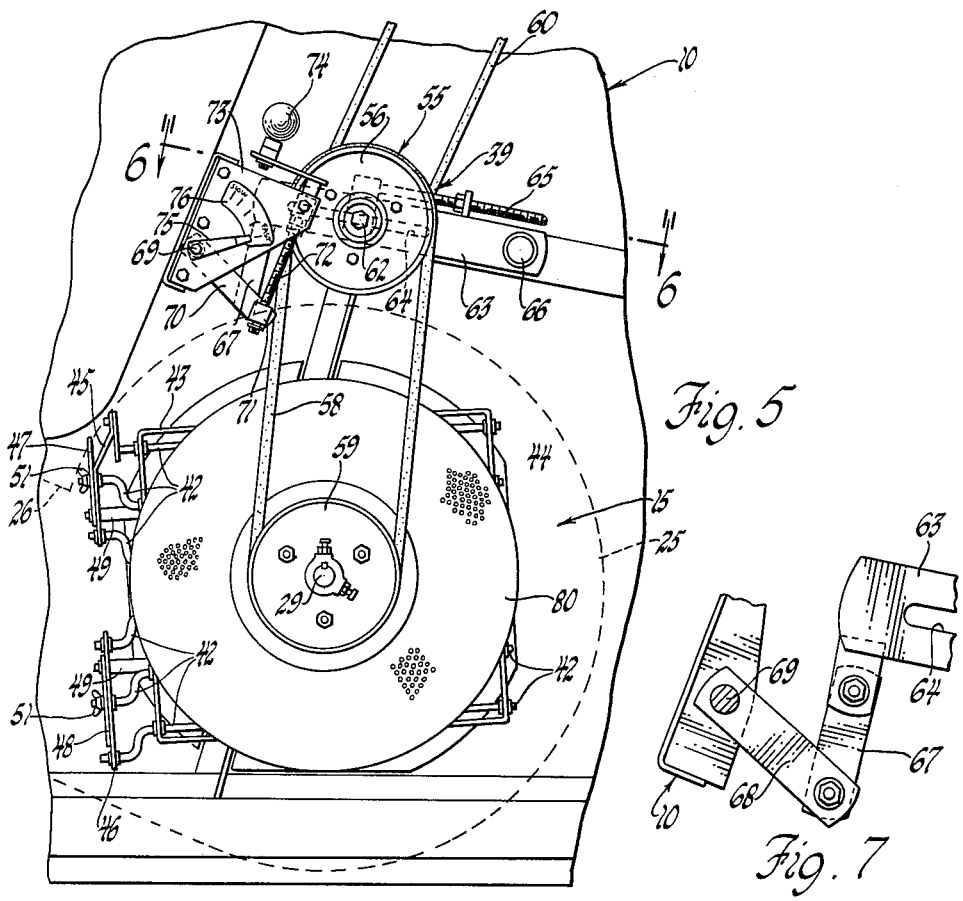
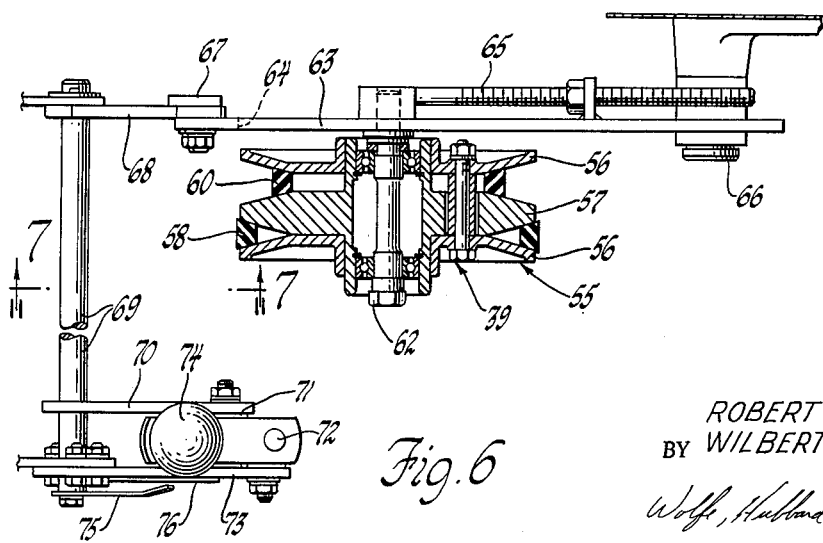
INVENTORS
ROBERT A. ASHTON &
BY WILBERT D. WEBER
ATTORNEYS.

United States Patent Office 3,213,857
Patented Oct. 26, 1965

3,213,857
ADJUSTABLE DRIVE AND AIR INTAKE FOR A
COMBINE FANNING MILL
Robert A. Ashton, Islington, Ontario, and Wilbert D.
Weber, Nashville, Ontario, Canada, assignors to
Massey-Ferguson Limited, Toronto, Ontario, Canada,
a corporation of Canada
Filed Mar. 15, 1963, Ser. No. 265,536
6 Claims. (Cl. 130—27)

This invention relates generally to agricultural combines and concerns, more particularly, an improved winnowing fan for such machines.

The winnowing fan, or fanning mill, of a conventional combine is positioned low in the combine frame and is effective to draw in outside air and generate an air blast up through the cleaning and separating structure of the combine. The air blast is intended to lift shaff, straw and other foreign material from the harvested material and clear it from the combine. To operate effectively and efficiently, the air flow rate must be adjusted to the nature and condition of the crop being harvested. That is, when harvesting a heavy grain, a stronger blast is desirable than can be used when harvesting a light grass seed.

Once the air flow rate is adjusted, it is obviously desirable to keep the selected rate uniform. The problem here is that fanning mill air intakes are usually screened to keep out flying debris, and this material tends to collect on and clog the screen so as to choke off the air supply.

Accordingly, it is the primary aim of the present invention to provide a combine fanning mill having infinitely variable control of the air blast that is generated which is effective over a very wide range. It is a related object to provide air flow control of this character through the use of inexpensive, easily manipulated mechanisms permitting exact regulation of both fan speed and fan air intake rate.

Another object is to assure a uniform fanning mill air blast by providing the adjustable air intakes referred to above with self-cleaning screens. A collateral object is to provide self-cleaning screens as referred to above which are very simple and economical, requiring virtually no additional parts or mechanisms.

Other objects and advantages of the invention will become apparent upon reading the following detailed description and upon reference to the drawings, in which:

FIG. 5 is a fragmentary side elevation of approximately that portion of the combine shown in FIG. 3;

FIG. 6 is an enlarged fragmentary section taken approximately along the line 6—6 in FIG. 5; and FIG. 7 is a fragmentary section taken along the line 7—7 in FIG. 6.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
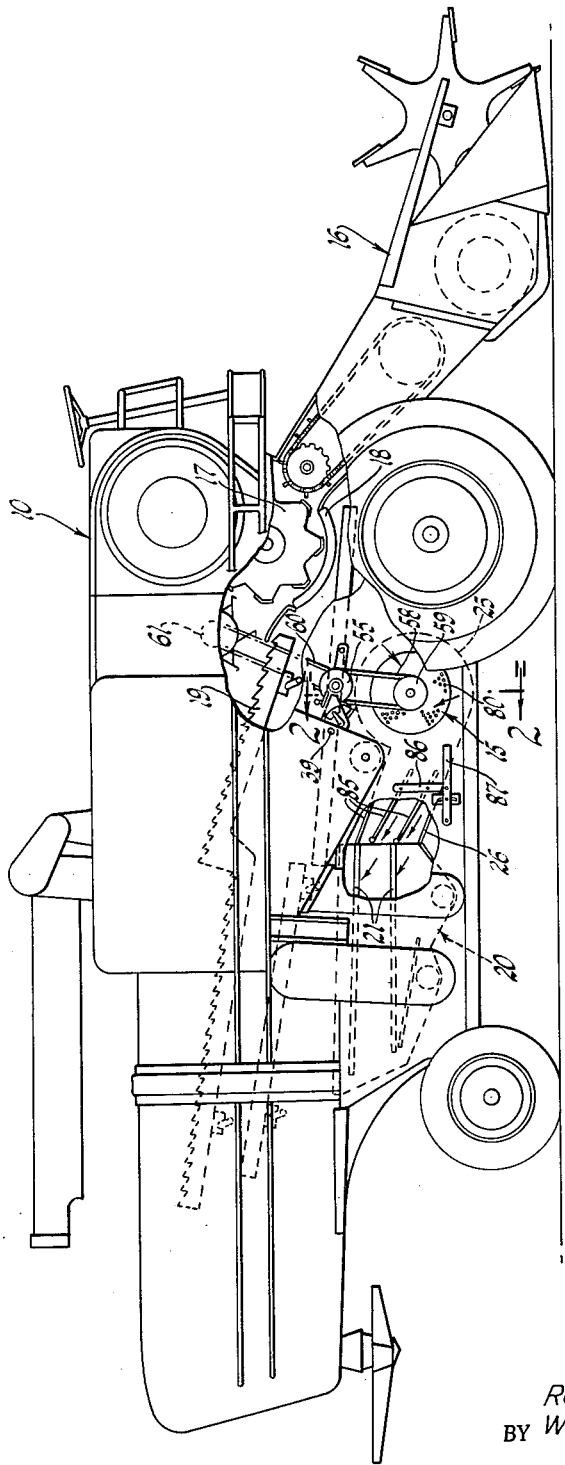
FIGURE 1 is a side elevation of a combine, with portions broken away, having a fanning mill embodying the present invention.

Turning first to FIG. 1, there is shown a combine 10 having a fanning mill 15 embodying the invention. As will be appreciated by those skilled in this art, crop material handled by the combine 10 is harvested by a header assembly 16, passed between a threshing cylinder 17 and a concave 18, and carried rearwardly over straw walkers 19 and through a separator assembly 20 having screens or sieves 21. The fanning mill 15 is mounted low in the combine frame, takes in air from the sides, as shown by the arrows in FIG. 1, and generates and discharges an air blast up through the separator assembly 20 and the straw walkers 19.

In the illustrated construction, the fanning mill 15 includes a generally cylindrical casing 25 having a tangentially opening air discharge passage 26. A fan 27 is mounted within the casing 25 and includes a plurality of axially extending blades 28 secured to a shaft 29 that is journalled coaxially within the casing 25 in a pair of bearings 30 and 31.

Figure 2:
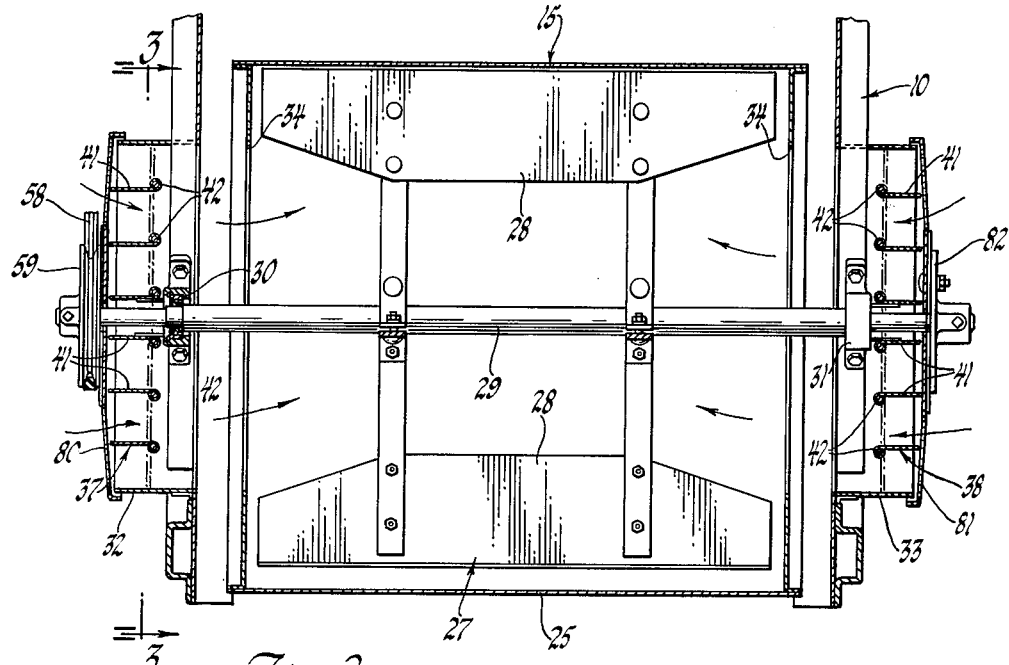
FIG. 2 is an enlarged fragmentary section taken approximately along the line 2—2 in FIG. 1.
Figure 4:
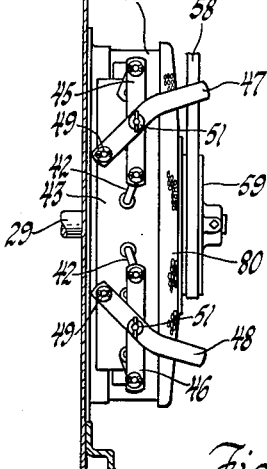
FIG. 4 is a fragmentary section taken approximately along the line 4—4 in FIG. 3.

Air is drawn into the fanning mill casing 25 through air intake ducts 32 and 33 which surround each end of the shaft 29. The casing 25 is formed with end openings 34 so that the air flow follows the paths indicated by the arrows in FIG. 2.

Pursuant to the invention, the air blast generated by the fanning mill 15 is controlled both by adjustable shutters 37 and 38 in the ducts 32, 33, respectively, and by an adjustable ratio driving connection 39 supplying power to the fan shaft 29.

Figure 3:
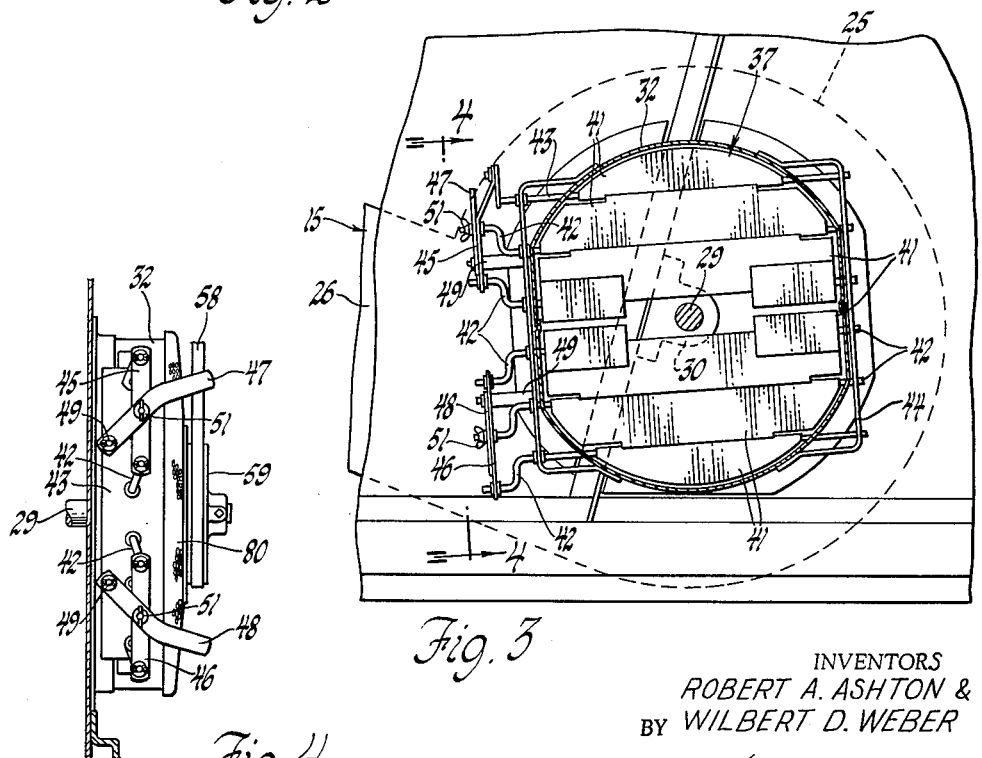
FIG. 3 is a section taken approximately along the line 3—3 in FIG. 2.

The shutters 37, 38 are alike and include shutter elements 41 mounted on crank rods 42 which are journalled in brackets 43 and 44 secured to the outer surface of the ducts 32, 33. The top three crank rods 42 are coupled by a common link 45, and the bottom three rods are coupled by a common link 46. Adjustable levers 47 and 48 are pivoted on posts 49 and are releasably secured by thumb screws 51 to the respective links 45, 46. Loosening of the thumb screws 51 permits the levers 47, 48 to be swung up and down about their posts 49, and this rotates the crank rods 42 so as to selectively swing the shutter elements 41 between their fully closed positions, shown in full lines in FIG. 3 and in dashed lines in FIG. 2, and their fully open positions shown in full lines in FIG. 2. By tightening the thumb screws 51, the shutters 37, 38 can be locked at any desired position of adjustment.

The adjustable ratio driving connection 39 includes a double, variable diameter pulley 55 having interconnected outer sieve plates 56 which float axially relative to an inner common plate 57. One driving belt 58 extends between the pulley 55 and a pulley 59 secured to one end of the fanning mill shaft 29. Another belt 60 is trained about the pulley 55 and a pulley 61 driven from the combine engine (see FIG. 1).

The pulley 55 is journalled on a shaft 62 that is secured to an arm 63, by being fitted through a slot 64 therein, and is held in adjusted position along the slot by a threaded rod 65. By threadably adjusting the length of the rod 65, the position of the pulley 55 can be shifted so as to properly tension the belts 58, 60.

The arm 63 is pivoted on a shaft 66 at one end and held, through a pivoted link 67, by one arm 68 of a two arm lever which includes a shaft 69 rotatably mounted in the combine frame. Another arm 70 also secured to the shaft 69 carries a pivoted nut 71 (see FIG. 5) that is threaded on a rod 72 held captive at its upper end on a bracket 73. A crank 74 is secured to the rod 72 so that it can be conveniently rotated by the combine operator. Rotation of the crank 74 rotates the rod 72 so as to run the nut 71 up and down, thereby turning the shaft 69 and raising and lowering the arm 63. This vertically shifts the position of the pulley 55 and, in the manner which will be familiar to those skilled in the art, causes the outer plates 56 to shift relative to the inner plate 57 of the pulley 55, thereby changing the ratio of the driving connection afforded by the belts 58, 60. Since the combine engine runs at a substantially uniform speed, the crank 74 gives the combine operator an infinitely variable adjustment of the speed at which the fan 27 is driven. In the illustrated embodiment, the shaft 69 carries a pointer 75 which cooperates with a scale 76 on the bracket 73 to provide a visual indication of the speed setting for the fan 27.

As a feature of the invention, circular screens 80 and 81 are mounted on the fan shaft 29 at the ends of the ducts 32, 33, respectively, that are opposite the fanning mill casing 25. The screen 80 is secured to the inside of the pulley 59 and the screen 81 is mounted on a hub 82 secured to the shaft 29. The screens 80, 81 are preferably unitary, rigid, perforated members which are effective to block the entry of flying debris and trash into the air intake ducts 32, 33. However, since the screens 80, 81 are secured to the fanning mill shaft 29, they rotate at high speed when the combine is in operation and thus are centrifugally self cleaning. Material does not tend to accumulate on the screens 80, 81 so as to clog and block off the air flow.

To further control the air flow from the fanning mill 15, a plurality of vanes 85 are mounted in the passage 26 (see FIG. 1). The vanes are pivoted at their rear ends and coupled by a link 86 which is secured to an adjusting lever 87 so that, by positioning the lever 87, changes can be made in the direction of the air flow from the fanning mill 15.

It can now be seen that there has been provided a combine fanning mill affording infinitely variable control of the air blast that is generated by the mill. The air intake to the fanning mill is precisely selectable by positioning the shutters 37, 38. In addition, the speed of the fan 27 can be selected by adjusting the variable ratio driving connection 39. These two adjustments give a very wide range of air blast volumes and velocities so that the combine can operate with peak efficiency and effectiveness for all crops and crop conditions. In addition, the self-cleaning screens guarding the air intakes for the fanning mill 15 assure that once a proper air blast setting has been achieved, that setting is not disturbed by accumulated dust and trash.

Those familiar with this art will also readily appreciate the suitability of the above dsecribed construction for mass production and, in particular, the simple and economical self-cleaning screen arrangement which makes use of the rotating fanning mill shaft.

We claim as our invention:

1. In a combine having a driving member, a fanning mill comprising, in combination, a generally cylindrical casing having a tangentially opening air discharge passage, a fan mounted on a shaft journalled coaxially within said casing, an air intake duct surrounding said shaft at one end of said casing, said casing being open to receive air from said duct, a plurality of shutter elements adjustably mounted in said duct for controlling the rate at which air is drawn through said duct by said fan, and an adjustable ratio driving connection disposed intermediate the driving member and the shaft for coupling said driving member to said shaft for controlling the speed of said fan.

2. In a combine having a driving member, a fanning mill comprising, in combination, a generally cylindrical casing having a tangentially opening air discharge passage, a fan mounted on a shaft journalled coaxially within said casing, an air intake duct surrounding said shaft at one end of said casing, said casing being open to receive air from said duct, a plurality of shutter elements disposed across said duct on interconnected crank rods journalled in the duct, a lever pivoted relative to said duct and coupled to said crank rods for selectively adjusting the position of said shutter elements and thus controlling the rate at which air is drawn through said duct by said fan, and an adjustable ratio driving connection disposed intermediate the driving member and the shaft for coupling said driving member and said shaft together to control the speed of said fan.

3. In a combine having a driving member, a fanning mill comprising, in combination, a generally cylindrical casing having a tangentially opening air discharge passage, a fan mounted on a shaft journalled coaxially within said casing, an air intake duct surrounding said shaft at one end of said casing, said casing being open to receive air from said duct, a plurality of shutter elements adjustably mounted in said duct for controlling the rate at which air is drawn through said duct by said fan, a pair of belts connected by a double variable diameter pulley, said pulley being disposed intermediate the driving member and the shaft for coupling said driving member and said shaft together, and means for adjustably positioning said pulley to adjust the driving ratio between said driving member and said fan shaft.

4. In a combine having a driving member, a fanning mill comprising, in combination, a generally cylindrical casing having a tangentially opening air discharge passage, a fan mounted on a shaft journalled coaxially within said casing, a generally cylindrical air intake duct coaxially surrounding said shaft at one end of said casing, said casing being open to receive air from said duct, a circular screen mounted on said shaft for rotation therewith and disposed over the end of said duct opposite said casing, a plurality of shutter elements adjustably mounted in said duct for controlling the rate at which air is drawn through said duct by said fan, and an adjustable ratio driving connection disposed intermediate the driving member and the shaft for coupling said driving member to said shaft to control the speed of said fan.

5. In a combine having a driving member, a fanning mill comprising, in combination, a generally cylindrical casing having a tangentially opening air discharge passage, a fan mounted on a shaft journalled coaxially within said casing, an air intake duct surrounding said shaft at one end of said casing, said casing being open to receive air from said duct, a pulley secured to said shaft just outside of said duct, a driven belt trained about said pulley for driving said fan, a screen secured to said pulley between the belt and the end of said duct so as to define a rotating cover for the air intake end of said duct, and an adjustable ratio driving connection disposed between the driving member and the driven belt for controlling the speed of the fan.

6. In a combine having a driving member, a fanning mill comprising, in combination, a generally cylindrical casing having a tangentially opening air discharge passage, a fan mounted on a shaft journalled coaxially within said casing, a generally cylindrical air intake duct coaxially surrounding said shaft at one end of said casing, said casing being open to receive air from said duct, a circular screen mounted on said shaft for rotation therewith and disposed over the end of said duct opposite said casing, and an adjustable ratio driving connection disposed intermediate the driving member and the shaft for connecting the driving member to the shaft for controlling the speed of the fan.

(References on following page)

References Cited by the Examiner

UNITED STATES PATENTS

| | | | |
|---|---|---|---|
| 371,411 | 10/87 | Best | 230—114 |
| 585,188 | 6/97 | Davis. | |
| 1,388,581 | 8/21 | Larson | 230—114 |
| 1,860,697 | 5/32 | Travis | 55—290 |
| 2,934,022 | 4/60 | Rodick et al. | 230—114 |

FOREIGN PATENTS 1,255,896  1/61  France.

OTHER REFERENCES

John Deere Operator's Manual, No. OM-H35-954 pages 72 and 73, dated Oct. 1, 1954.

ABRAHAM G. STONE, *Primary Examiner.*

ARNOLD RUEGG, T. GRAHAM CRAVER,
*Examiners.*